US012100881B2

(12) United States Patent
Shikishima

(10) Patent No.: US 12,100,881 B2
(45) Date of Patent: Sep. 24, 2024

(54) DIRECTIONAL COUPLER

(71) Applicant: Murata Manufacturing Co., Ltd., Kyoto (JP)

(72) Inventor: Ryoki Shikishima, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 589 days.

(21) Appl. No.: 17/213,814

(22) Filed: Mar. 26, 2021

(65) Prior Publication Data

US 2021/0218120 A1 Jul. 15, 2021

Related U.S. Application Data

(63) Continuation of application No. PCT/JP2019/036626, filed on Sep. 18, 2019.

(30) Foreign Application Priority Data

Sep. 28, 2018 (JP) ................................ 2018-183287

(51) Int. Cl.
*H01P 5/18* (2006.01)

(52) U.S. Cl.
CPC .................................... *H01P 5/18* (2013.01)

(58) Field of Classification Search
CPC ......... H01P 5/18; H01P 5/185; H01F 17/0006
See application file for complete search history.

(56) References Cited

U.S. PATENT DOCUMENTS 3,999,150 A * 12/1976 Caragliano ............ H01P 5/185 333/116
6,771,141 B2 * 8/2004 Iida ........................ H01P 5/185 333/116
2003/0076191 A1 4/2003 Lida et al.
2013/0207710 A1 * 8/2013 Basawapatna ......... G01R 21/01 327/306
2016/0028363 A1 1/2016 Li
2017/0110779 A1 4/2017 Hanaoka

FOREIGN PATENT DOCUMENTS

| | | | |
|---|---|---|---|
| CN | 1412887 | A | 4/2003 |
| JP | 2002-330008 | A | 11/2002 |
| JP | 2003-258512 | A | 9/2003 |
| JP | 2011-040978 | A | 2/2011 |
| JP | 2013-046305 | A | 3/2013 |
| WO | 2016-006676 | A1 | 1/2016 |

OTHER PUBLICATIONS

International Search Report for PCT/JP2019/036626 dated Oct. 15, 2019.
Written Opinion for for PCT/JP2019/036626 dated Oct. 15, 2019.

* cited by examiner

*Primary Examiner* — Andrea Lindgren Baltzell
*Assistant Examiner* — Kimberly E Glenn
(74) *Attorney, Agent, or Firm* — Pearne & Gordon LLP

(57) ABSTRACT

A directional coupler includes: a main line (11) through which a main signal (31) flows; a sub-line (12) through which a sub-signal (32) corresponding to the main signal (31) flows by electromagnetic coupling with the main line (11); and an inductor (13) that is connected in series with one line among the main line (11) and the sub-line (12) and through which one signal among the main signal (31) and the sub-signal (32) flows. A first portion (41) of a first wiring line (21) forming the inductor (13) and a second portion (42) of a second wiring line (22) forming the other line among the main line (11) and the sub-line (12) are electromagnetically coupled with each other.

19 Claims, 9 Drawing Sheets

DIRECTIONAL COUPLER

CROSS REFERENCE TO RELATED APPLICATION

This is a continuation of International Application No. PCT/JP2019/036626 filed on Sep. 18, 2019 which claims priority from Japanese Patent Application No. 2018-183287 filed on Sep. 28, 2018. The contents of these applications are incorporated herein by reference in their entireties.

BACKGROUND OF THE DISCLOSURE

Field of the Disclosure

The present disclosure relates to a directional coupler.

Description of the Related Art

Patent Document 1 describes a directional coupler having a main line and a sub-line. Between the sub-line and a coupling port, a low-pass filter unit constituted by an inductor and a capacitor is connected. Accordingly, a resonance point is formed in a range higher than the use frequency range to flatten the degree of coupling in the use frequency range.

Patent Document 2 describes a directional coupler including a main line and a sub-line, and a matching circuit connected to the directional coupler. The matching circuit includes an inductor connected in series with the main line to attain matching with an external circuit.

Patent Document 1: Japanese Unexamined Patent Application Publication No. 2013-46305

Patent Document 2: International Publication No. 2016/006676

BRIEF SUMMARY OF THE DISCLOSURE

One of the characteristics of directional couplers is the degree of coupling. The degree of coupling of directional couplers generally increases as the main line and the sub-line are longer. However, as the size of devices has been reduced recently, the size of directional couplers is restricted, and it is difficult for the main line and the sub-line to have lengths for attaining a desired degree of coupling. That is, a shortage of the degree of coupling of directional couplers tends to occur.

Accordingly, an object of the present disclosure is to provide a directional coupler in which a shortage of the degree of coupling is readily compensated for without an increase in size.

To achieve the above-described object, a directional coupler according to an aspect of the present disclosure includes: a main line through which a main signal flows; a sub-line through which a sub-signal corresponding to the main signal flows by electromagnetic coupling with the main line; and an inductor that is connected in series with one line among the main line and the sub-line and through which one signal among the main signal and the sub-signal flows. A first portion of a first wiring line forming the inductor and a second portion of a second wiring line forming the other line among the main line and the sub-line are electromagnetically coupled with each other.

To achieve the above-described object, a directional coupler according to an aspect of the present disclosure includes: a main line through which a main signal flows; a sub-line through which a sub-signal corresponding to the main signal flows by electromagnetic coupling with the main line; and an inductor that is connected in series with one line among the main line and the sub-line and through which one signal among the main signal and the sub-signal flows. A first portion of a first wiring line forming the inductor and a second portion of a second wiring line forming the other line among the main line and the sub-line are disposed so as to face each other such that a direction of travel of a first signal, in the first portion, flowing through the first wiring line, the first signal being the main signal or the sub-signal, and a direction of travel of a second signal, in the second portion, flowing through the second wiring line are opposite to each other.

With the directional coupler according to the present disclosure, electromagnetic coupling that increases the sub-signal can be formed between the first wiring line and the second wiring line by the first portion and the second portion. Accordingly, the effective degree of coupling of the directional coupler can be increased, and a shortage of the degree of coupling is readily compensated for without an increase in the size of the directional coupler.

DETAILED DESCRIPTION OF THE DISCLOSURE

Embodiments of the present disclosure will be described in detail with reference to the drawings. Note that all embodiments described below illustrate general or specific examples. Numerical values, forms, materials, constituent elements, the arrangements and connections of constituent elements, and so on indicated in the following embodiments are examples and are not intended to limit the present disclosure.

First Embodiment

Regarding a directional coupler according to a first embodiment, an example directional coupler having a main line, a sub-line, and an inductor connected in series with the main line is described.

Figure 1:
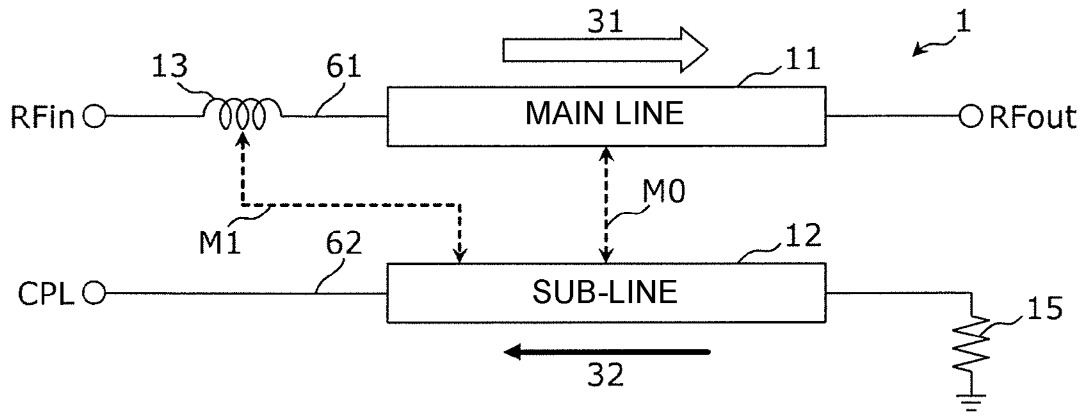
FIG. 1 is a circuit diagram illustrating an example functional configuration of a directional coupler according to a first embodiment.

FIG. 1 is a circuit diagram illustrating an example functional configuration of a directional coupler 1. As illustrated in FIG. 1, the directional coupler 1 includes a main line 11, a sub-line 12, an inductor 13, and a resistor 15.

The inductor 13 is connected in series with the main line 11. The inductor 13 may be, for example, for matching of the main line 11. One end of a signal path 61 that includes the inductor 13 and the main line 11 is connected to an input port RFin, and the other end thereof is connected to an output port RFout. One end of a signal path 62 that includes the sub-line 12 is connected to a coupling port CPL, and the other end thereof is terminated to ground.

The main line 11 and the sub-line 12 are electromagnetically coupled with each other (the dotted arrow M0 in FIG. 1). A main signal 31, which is a detection target, is fed to the input port RFin and flows through the inductor 13 and the main line 11 toward the output port RFout. Here, the direction in which a signal flows is the direction in which the power of the signal propagates and is also referred to as the direction of travel of the signal.

Part of the power of the main signal 31 is taken out to the sub-line 12 as a sub-signal 32 by electromagnetic coupling with the main line 11. The sub-signal 32 flows through the sub-line 12 in a direction opposite to the direction of travel of the main signal 31 in the main line 11 and is outputted from the coupling port CPL. The sub-signal 32 indicates the result of detection of the main signal 31.

The resistor 15 is connected in series between the sub-line 12 and ground. The resistor 15 is a termination resistor for terminating a reflected wave of the sub-signal 32 on the other end side of the sub-line 12.

The degree of coupling of the directional coupler 1 is expressed by the ratio of the power of the sub-signal 32 flowing through the sub-line 12 to the power of the main signal 31 flowing through the main line 11. As described above, the degree of coupling of directional couplers generally increases as the main line and the sub-line are longer.

However, as the size of devices has been reduced recently, the size of directional couplers is restricted, and it is difficult for the main line and the sub-line to have lengths for attaining a desired degree of coupling. That is, a shortage of the degree of coupling of directional couplers tends to occur.

Accordingly, in the directional coupler 1, electromagnetic coupling (the dotted arrow M1 in FIG. 1) that increases the sub-signal 32 is formed between the inductor 13 and the sub-line 12.

Figure 2:
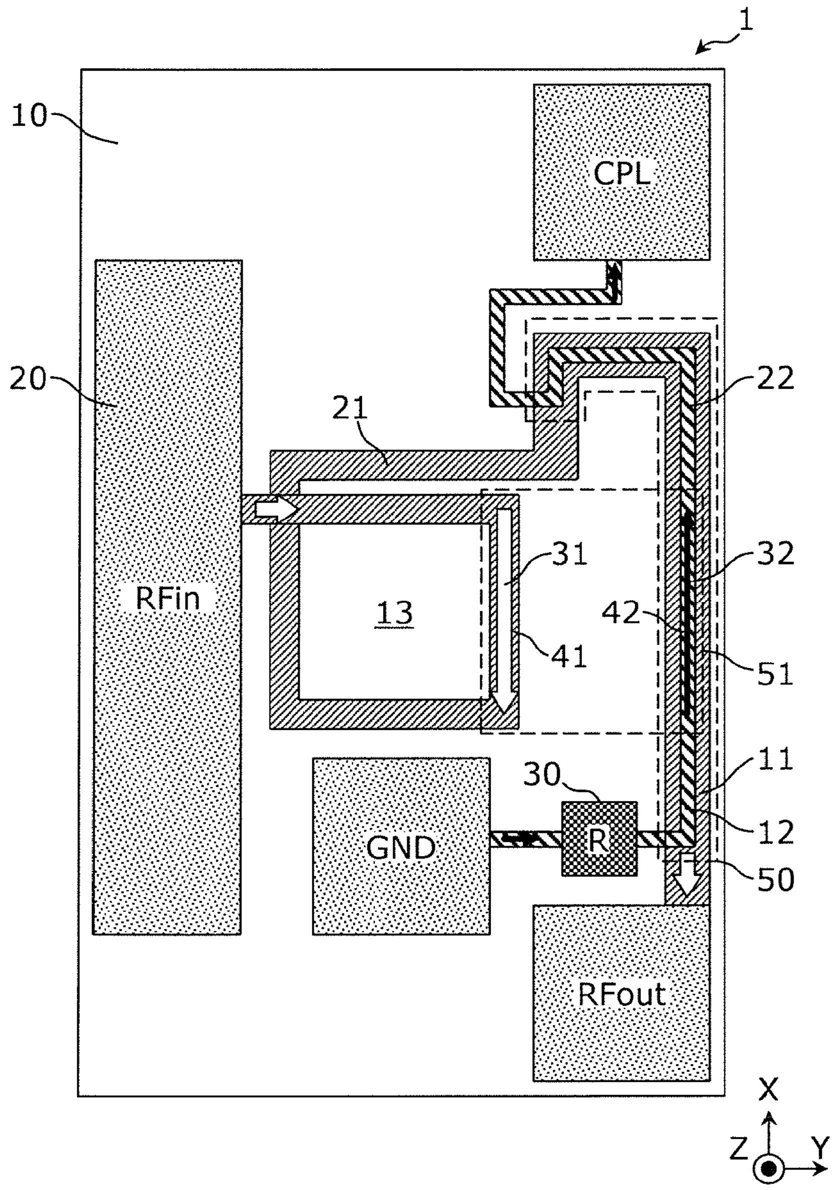
FIG. 2 is a plan view illustrating an example layout of the directional coupler according to the first embodiment.

FIG. 2 is a plan view illustrating an example layout of the directional coupler 1. As illustrated in FIG. 2, the directional coupler 1 is formed by disposing an electrode 20 and wiring lines 21 and 22 in or on a substrate 10. In FIG. 2, the main surface of the substrate 10 is represented as the XY plane, and the thickness direction of the substrate 10 is represented as the Z direction. Further, constituent elements of the same type are represented by a pattern of the same type, and duplicated numerals thereof are omitted as appropriate.

The substrate 10 is a multilayer substrate. The wiring line 21 and the wiring line 22 that overlap in plan view (that is, when viewed in the Z direction) are disposed in different layers with an insulation layer (not illustrated) interposed therebetween, and portions of the wiring line 21 that cross each other are disposed in different layers with an insulation layer (not illustrated) interposed therebetween.

The electrode 20 forms the input port RFin, the output port RFout, the coupling port CPL, and a ground port GND. The wiring line 21 forms the signal path 61 between the input port RFin and the output port RFout. The wiring line 22 forms the signal path 62 between the ground port GND and the coupling port CPL.

A resistance element 30 forms the resistor 15, which is a termination resistor.

Portions of the wiring lines 21 and 22 included in a region 50 function as the main line 11 and the sub-line 12 respectively. The main line 11 and the sub-line 12 are disposed so as to be stacked in the Z direction with an insulation layer (not illustrated) interposed therebetween and are electromagnetically coupled with each other. By electromagnetic coupling between the main line 11 and the sub-line 12, part of the power of the main signal 31 flowing through the main line 11 is taken out to the sub-line 12 as the sub-signal 32. Therefore, the original degree of coupling of the directional coupler 1 increases as the region 50 is larger, that is, the main line 11 and the sub-line 12 are longer.

Note that in the directional coupler 1, the wiring line 21 is "first wiring line" in the present disclosure, and the main signal 31 flowing through the wiring line 21 is "first signal" in the present disclosure. Further, the wiring line 22 is "second wiring line" in the present disclosure, and the sub-signal 32 flowing through the wiring line 22 is "second signal" in the present disclosure.

The wiring line 21 forms the inductor 13 in at least part of a portion other than the main line 11. The inductor 13 functions as, for example, a matching circuit for attaining matching at the input end of the main line 11. A portion 41 of the wiring line 21 forming the inductor 13 and a portion 42 of the wiring line 22 forming the sub-line 12 are disposed so as to face each other such that the direction of travel of the main signal 31 in the portion 41 and the direction of travel of the sub-signal 32 in the portion 42 are opposite to each other in a region 51.

In the example illustrated in FIG. 2, the direction of travel of the main signal 31 in the portion 41 is the −X direction, the direction of travel of the sub-signal 32 in the portion 42 is the +X direction, and the portion 41 and the portion 42 face each other in the Y direction.

Note that in the directional coupler 1, the portion 41 is "first portion" in the present disclosure, and the portion 42 is "second portion" in the present disclosure.

Here, facing each other means that, for example, the shortest distance from any point in the portion 41 to the portion 42 is substantially constant, and a direction in which the portion 41 and the portion 42 are connected to each other at the shortest distance may be assumed to be a direction in which the portion 41 and the portion 42 face each other.

With this layout, the portion 41 of the wiring line 21 forming the inductor 13 and the portion 42 of the wiring line 22 forming the sub-line 12 are disposed so as to face each other in the region 51. With the disposition in which the direction of travel of the main signal 31 in the portion 41 and the direction of travel of the sub-signal 32 in the portion 42 are opposite to each other, a signal that travels in a direction the same as the direction of the sub-signal 32 taken out from the main line 11 to the sub-line 12 in the region 50 can be taken out from the inductor 13 to the sub-line 12. That is, electromagnetic coupling that increases the sub-signal 32 can be formed by the portion 41 and the portion 42. Accordingly, the effective degree of coupling of the directional coupler 1 can be increased, and a shortage of the degree of coupling is readily compensated for without an increase in the size of the directional coupler 1.

Effects produced by the directional coupler 1 are described on the basis of a comparison with a directional coupler 9, which is a comparative example.

Figure 3:
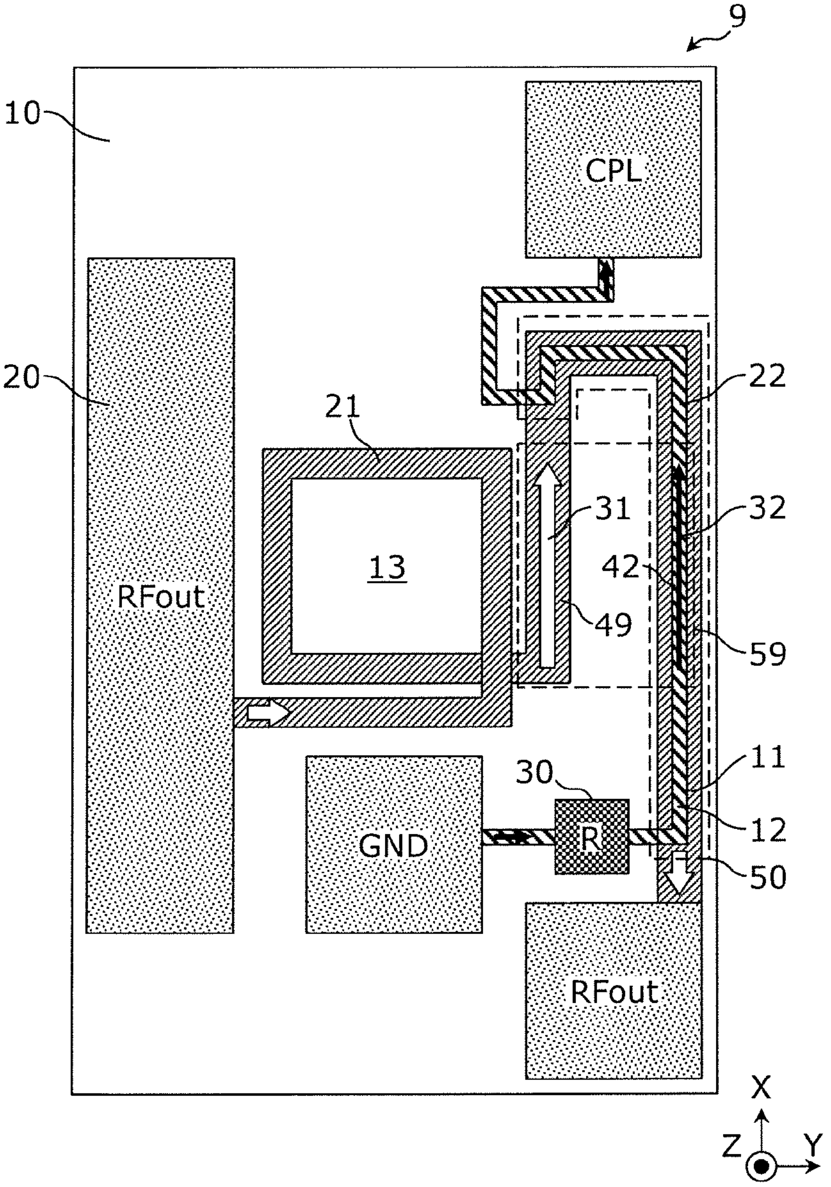
FIG. 3 is a plan view illustrating an example layout of a directional coupler according to a comparative example.

FIG. 3 is a plan view illustrating an example layout of the directional coupler 9. As illustrated in FIG. 3, the directional coupler 9 differs from the directional coupler 1 illustrated in FIG. 2 in the layout of the wiring line 21.

In the directional coupler 9, a portion 49 of the wiring line 21 forming the inductor 13 and the portion 42 of the wiring line 22 are disposed so as to face each other such that the direction of travel of the main signal 31 in the portion 49 and the direction of travel of the sub-signal 32 in the portion 42 are the same in a region 59.

In the example illustrated in FIG. 3, each of the direction of travel of the main signal 31 in the portion 49 and the direction of travel of the sub-signal 32 in the portion 42 is the +X direction, and the portion 49 and the portion 42 face each other in the Y direction.

With this layout, a signal that travels in a direction opposite to the direction of the sub-signal 32 taken out from the main line 11 to the sub-line 12 in the region 50 may be taken out from the portion 49 to the portion 42. That is, electromagnetic coupling that decreases the sub-signal 32 can be formed by the portion 49 and the portion 42.

On the basis of the layouts illustrated in FIG. 2 and FIG. 3, models of the directional couplers 1 and 9 are set, and signal characteristics are obtained by simulation. In the simulation, models of the directional couplers 1 and 9 are set on the basis of a design in which the use frequency range of the directional couplers 1 and 9 is assumed to be 5 GHz to 6 GHZ.

Figure 4:
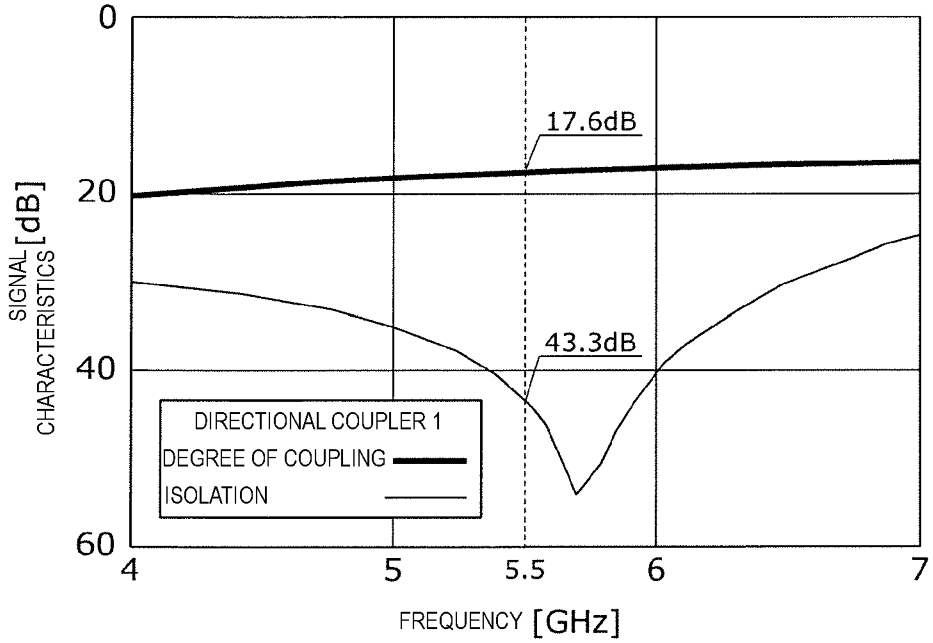
FIG. 4 is a graph showing example signal characteristics of the directional coupler according to the first embodiment.
Figure 5:
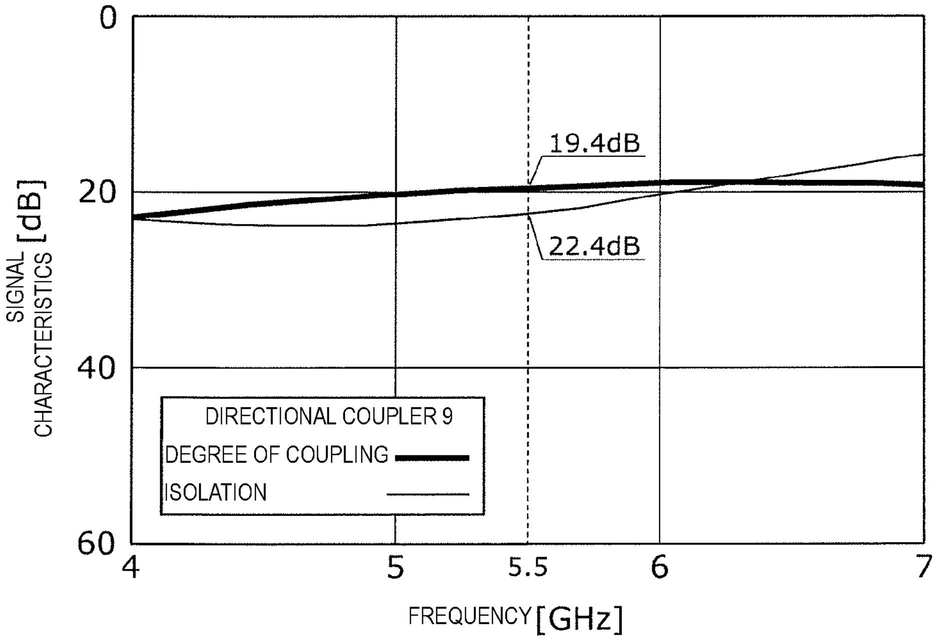
FIG. 5 is a graph showing example signal characteristics of the directional coupler according to the comparative example.

FIG. 4 and FIG. 5 are graphs showing example signal characteristics of the directional couplers 1 and 9 respectively and indicate the results of simulation of the degree of coupling and isolation. In the examples illustrated in FIG. 4 and FIG. 5, at 5.5 GHZ, the degree of coupling of the directional coupler 1 is 17.6 dB and the isolation thereof is 43.3 dB, and the degree of coupling of the directional coupler 9 is 19.4 dB and the isolation thereof is 22.4 dB.

As a result of a comparison between FIG. 4 and FIG. 5, it is found that in the directional coupler 1, a higher degree of coupling and a larger isolation are attained in the entire use frequency range of 5 GHZ to 6 GHZ than in the directional coupler 9.

Other features of the layout of the directional coupler 1 are described with reference to FIG. 6.

Figure 6:
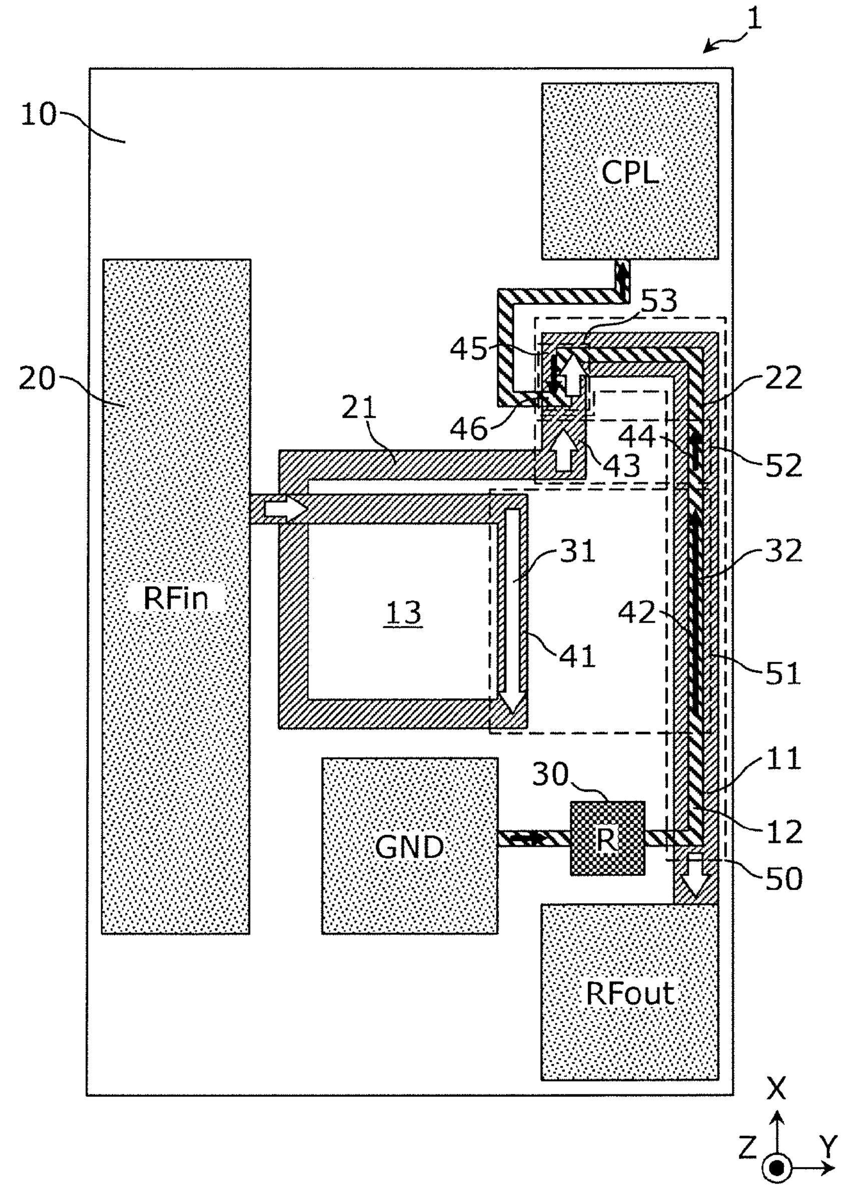
FIG. 6 is a plan view illustrating an example layout of the directional coupler according to the first embodiment.

FIG. 6 is a plan view illustrating an example layout of the directional coupler 1, which is obtained by adding numerals for explanation to the layout illustrated in FIG. 2. As illustrated in FIG. 6, a portion 43 of the wiring line 21 and a portion 44 of the wiring line 22 are disposed so as to face each other such that the direction of travel of the main signal 31 in the portion 43 and the direction of travel of the sub-signal 32 in the portion 44 are the same in a region 52.

In the example illustrated in FIG. 6, the direction of travel of the main signal 31 in the portion 43 is the +X direction, the direction of travel of the sub-signal 32 in the portion 44 is the +X direction, and the portion 43 and the portion 44 face each other in the Y direction.

Note that in the directional coupler 1, the portion 43 is "third portion" in the present disclosure, and the portion 44 is "fourth portion" in the present disclosure.

Both the length of the portion 43 and that of the portion 44 are shorter than the length of the portion 41 and that of the portion 42. In other words, in the extending directions of the wiring lines, the extending length of the region 52 is shorter than the extending length of the region 51.

With this layout, in a case where electromagnetic coupling that decreases the sub-signal 32 is formed by the portion 43 and the portion 44, the amount of decrease in the sub-signal 32 by the portion 43 and the portion 44 is readily made below the amount of increase in the sub-signal 32 by the portion 41 and the portion 42.

As described above, the directional coupler 1 may include the portion 43 and the portion 44 that are electromagnetically coupled with each other so as to decrease the sub-signal 32. If the amount of decrease in the sub-signal 32 by the portion 43 and the portion 44 is less than the amount of increase in the sub-signal 32 by the portion 41 and the portion 42, the effective degree of coupling of the directional coupler 1 increases, and a shortage of the degree of coupling is readily compensated for without an increase in the size of the directional coupler 1.

Further, in FIG. 6, a portion 45 of the wiring line 21 and a portion 46 of the wiring line 22 are disposed so as to face each other such that the direction of travel of the main signal 31 in the portion 45 and the direction of travel of the sub-signal 32 in the portion 46 are opposite to each other in a region 53.

In the example illustrated in FIG. 6, the direction of travel of the main signal 31 in the portion 45 is the +X direction, the direction of travel of the sub-signal 32 in the portion 46 is the −X direction, and the portion 45 and the portion 46 face each other in the Z direction.

Note that in the directional coupler 1, the portion 45 is "fifth portion" in the present disclosure, and the portion 46 is "sixth portion" in the present disclosure.

With this layout, in addition to electromagnetic coupling by the portion 41 and the portion 42, electromagnetic coupling that increases the sub-signal 32 can be further formed by the portion 45 and the portion 46. Accordingly, the effective degree of coupling of the directional coupler 1 can be significantly increased, and a shortage of the degree of coupling is readily compensated for without an increase in the size of the directional coupler 1.

Note that as described above, portions in which the directions of travel of signals are opposite to each other may face each other in the Y direction as with the portion 41 and the portion 42, may face each other in the Z direction as with the portion 45 and the portion 46, or may face each other in the X direction.

In plan view of the directional coupler 1 (in the example illustrated in FIG. 6, when viewed in the Z direction), no elements or wiring lines are disposed between the portion 41 of the wiring line 21 and the portion 42 of the wiring line 22.

With this layout, the portion 41 and the portion 42 are readily disposed close to each other, and therefore, electromagnetic coupling that significantly increases the sub-signal 32 is readily formed. Accordingly, the effective degree of coupling of the directional coupler 1 can be effectively increased, and a shortage of the degree of coupling is readily compensated for without an increase in the size of the directional coupler 1.

Effects produced by a layout in which the portion 41 of the wiring line 21 and the portion 42 of the wiring line 22 are disposed still closer to each other are described in detail.

Figure 7:
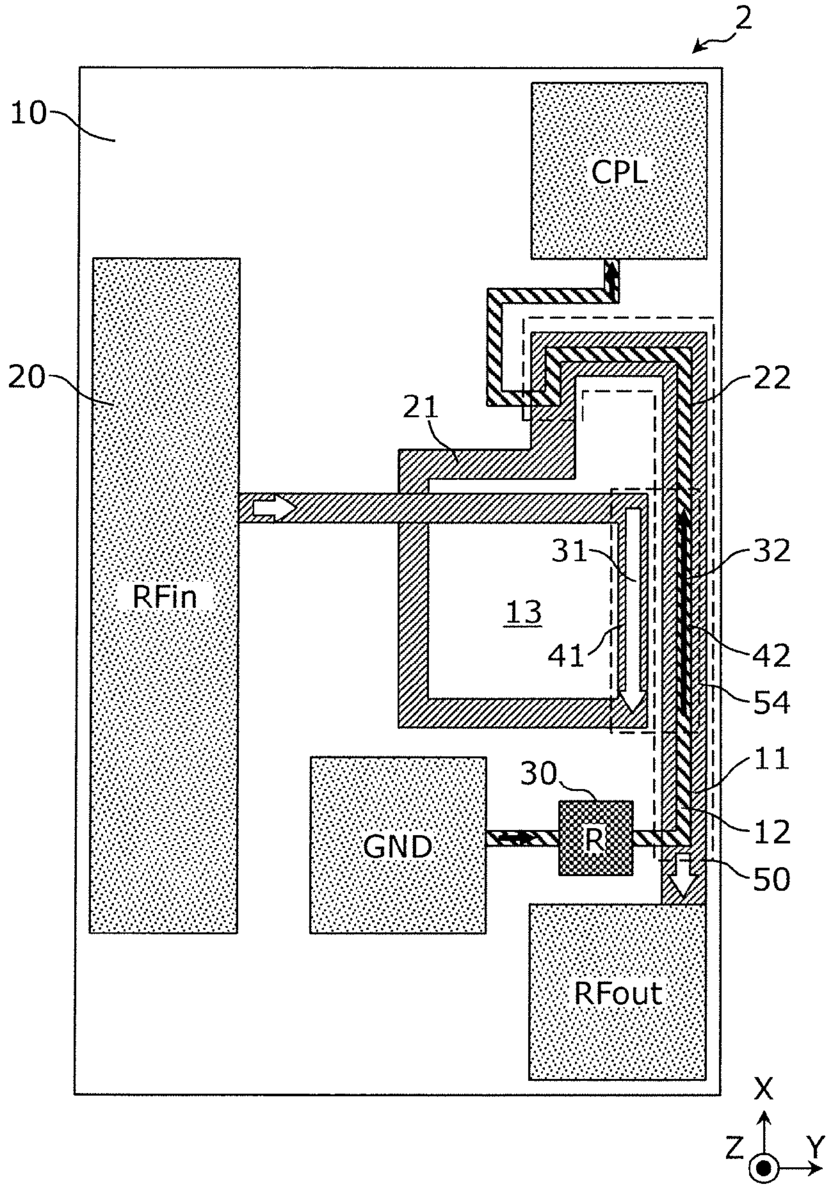
FIG. 7 is a plan view illustrating another example layout of the directional coupler according to the first embodiment.

FIG. 7 is a plan view illustrating an example layout of a directional coupler 2. As illustrated in FIG. 7, the directional coupler 2 differs from the directional coupler 1 illustrated in FIG. 6 in the layout of the wiring line 21. Specifically, in the directional coupler 2, the portion 41 of the wiring line 21 and the portion 42 of the wiring line 22 are closer to each other in a region 54 than the portion 41 and the portion 42 in the directional coupler 1.

For example, in FIG. 7, the portion 41 of the wiring line 21 is a portion closest to the wiring line 22 in plan view in the portion of the wiring line 21 forming the inductor 13. That is, the distance between the portion 41 of the wiring line 21 and the portion 42 of the wiring line 22 is shorter than the shortest distance between any portion, other than the portion 41, in the portion of the wiring line 21 forming the inductor 13 and the wiring line 22. Accordingly, in plan view, in the portion of the wiring line 21 forming the inductor 13, in a portion (the portion 41 in FIG. 7) closest to the wiring line 22, the direction of travel of a signal traveling through the wiring line 21 and the direction of travel of a signal traveling through the wiring line 22 are opposite to each other.

On the basis of the layout illustrated in FIG. 7, a model of the directional coupler 2 is set, and signal characteristics are obtained by simulation. In the simulation, a model of the directional coupler 2 is set on the basis of a design in which the use frequency range of the directional coupler 2 is assumed to be 5 GHz to 6 GHZ.

Figure 8:
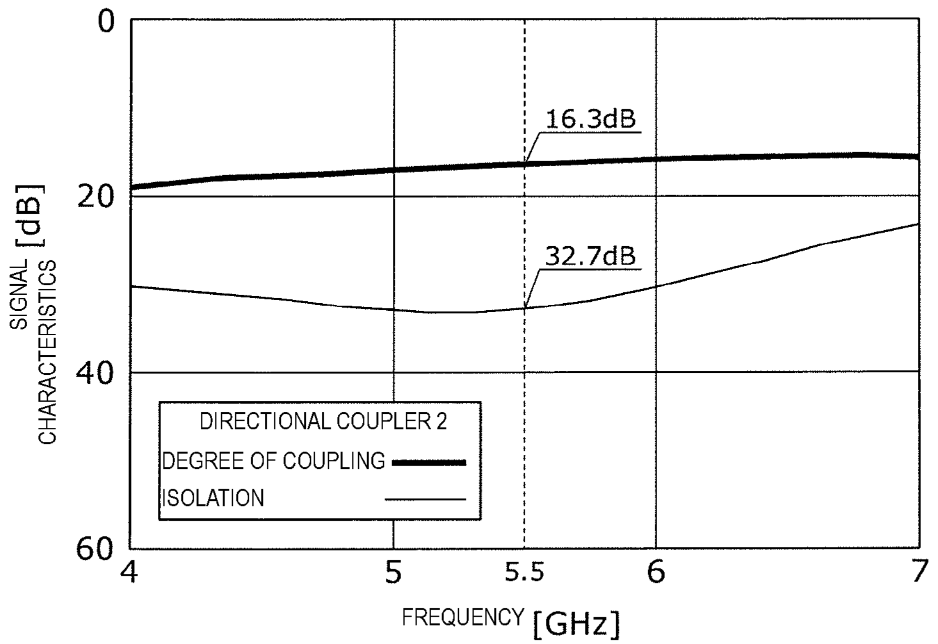
FIG. 8 is a graph showing other example signal characteristics of the directional coupler according to the first embodiment.

FIG. 8 is a graph showing example signal characteristics of the directional coupler 2 and indicates the results of simulation of the degree of coupling and isolation. In the example illustrated in FIG. 8, at 5.5 GHZ, the degree of coupling of the directional coupler 2 is 16.3 dB and the isolation thereof is 32.7 dB.

As a result of a comparison between FIG. 8 and FIG. 4, it is found that in the directional coupler 2, a higher degree of coupling is attained in the entire use frequency range of 5 GHz to 6 GHz than in the directional coupler 1.

Second Embodiment

In the first embodiment, an example directional coupler in which the inductor 13 connected in series with the main line 11 is electromagnetically coupled with the sub-line 12 has been described; however, the present disclosure is not limited to this example. Regarding a directional coupler according to a second embodiment, an example directional coupler having a main line, a sub-line, and an inductor connected in series with the sub-line is described below. Also, with the directional coupler in which the inductor connected in series with the sub-line is electromagnetically coupled with the main line, a directional coupler in which a shortage of the degree of coupling is readily compensated for without an increase in size can be obtained.

Figure 9:
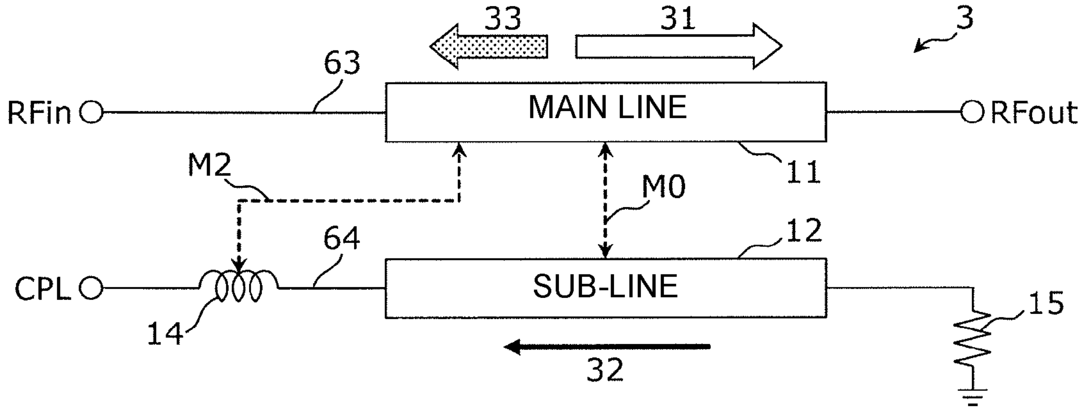
FIG. 9 is a circuit diagram illustrating an example functional configuration of a directional coupler according to a second embodiment.

FIG. 9 is a circuit diagram illustrating an example functional configuration of the directional coupler according to the second embodiment. As illustrated in FIG. 9, a directional coupler 3 includes the main line 11, the sub-line 12, an inductor 14, and the resistor 15.

In the example illustrated in FIG. 9, in addition to the main signal 31 flowing through the main line 11, a reflected wave 33 of the main signal 31 flowing through the main line 11 in a direction opposite to the direction of the main signal 31 is illustrated. The reflected wave 33 of the main signal 31 is a signal produced as a result of the main signal 31 reflected on the output port RFout side, and travels through the main line 11 in a direction opposite to the direction of the main signal 31 from the output port RFout side toward the input port RFin side. The reflected wave 33 will be referred to below in a description of an isolation characteristic.

The inductor 14 is connected in series with the sub-line 12. The inductor 14 may be, for example, a filter for selecting the sub-signal 32 having a desired frequency from a signal taken out from the sub-line 12. One end of a signal path 63 that includes the main line 11 is connected to the input port RFin, and the other end thereof is connected to the output port RFout. One end of a signal path 64 that includes the inductor 14 and the sub-line 12 is connected to the coupling port CPL, and the other end thereof is terminated to ground.

In the directional coupler 3, electromagnetic coupling (the dotted arrow M2 in FIG. 9) that increases the sub-signal 32 is formed between the inductor 14 and the main line 11. Specifically, based on an idea similar to that for the directional couplers 1 and 2, a first portion of a wiring line forming the inductor 14 and a second portion of a wiring line forming the main line 11 are disposed so as to face each other such that the direction of travel of the sub-signal 32 in the first portion and the direction of travel of the main signal 31 in the second portion are opposite to each other.

Figure 10:
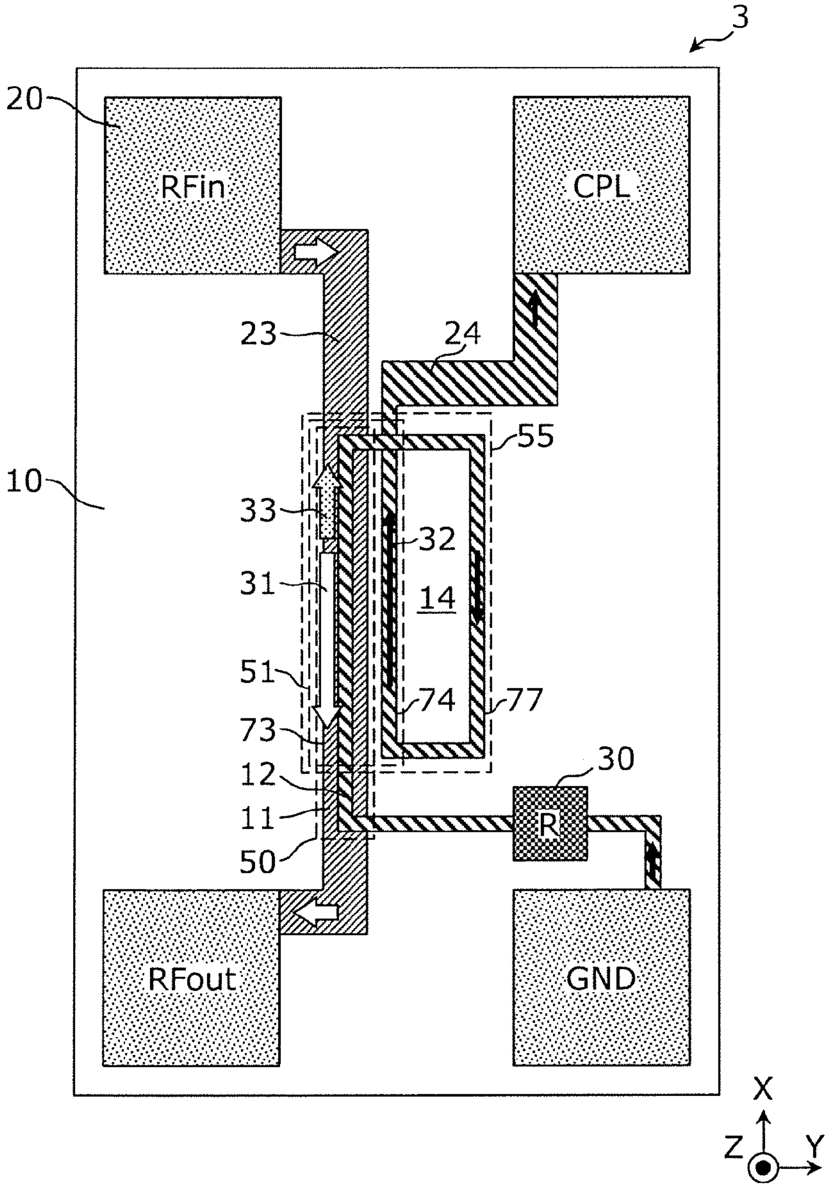
FIG. 10 is a plan view illustrating an example layout of the directional coupler according to the second embodiment.

FIG. 10 is a plan view illustrating an example layout of the directional coupler 3. As illustrated in FIG. 10, the directional coupler 3 is formed by disposing the electrode 20 and wiring lines 23 and 24 in or on the substrate 10. In FIG. 10, the main surface of the substrate 10 is represented as the XY plane, and the thickness direction of the substrate 10 is represented as the Z direction. Further, constituent elements of the same type are represented by a pattern of the same type, and duplicated numerals thereof are omitted as appropriate.

The substrate 10 is a multilayer substrate. The wiring line 23 and the wiring line 24 that overlap in plan view (that is, when viewed in the Z direction) are disposed in different layers with an insulation layer (not illustrated) interposed therebetween, and portions of the wiring line 24 that cross each other are disposed in different layers with an insulation layer (not illustrated) interposed therebetween.

The electrode 20 forms the input port RFin, the output port RFout, the coupling port CPL, and the ground port GND. The wiring line 23 forms the signal path 63 between the input port RFin and the output port RFout. The wiring line 24 forms the signal path 64 between the ground port GND and the coupling port CPL.

The resistance element 30 forms the resistor 15, which is a termination resistor.

Portions of the wiring lines 23 and 24 included in the region 50 function as the main line 11 and the sub-line 12 respectively. The main line 11 and the sub-line 12 are disposed so as to be stacked in the Z direction with an insulation layer (not illustrated) interposed therebetween and are electromagnetically coupled with each other. By electromagnetic coupling between the main line 11 and the sub-line 12, part of the power of the main signal 31 flowing through the main line 11 is taken out to the sub-line 12 as the sub-signal 32.

Note that in the directional coupler 3, the wiring line 24 is "first wiring line" in the present disclosure, and the sub-signal 32 flowing through the wiring line 24 is "first signal" in the present disclosure. Further, the wiring line 23 is "second wiring line" in the present disclosure, and the main signal 31 flowing through the wiring line 23 is "second signal" in the present disclosure.

The wiring line 24 forms the inductor 14 in at least part of a portion other than the sub-line 12. A portion 74 of the wiring line 24 forming the inductor 14 and a portion 73 of the wiring line 23 forming the main line 11 are disposed so as to face each other such that the direction of travel of the sub-signal 32 in the portion 74 and the direction of travel of the main signal 31 in the portion 73 are opposite to each other in the region 51.

In the example illustrated in FIG. 10, the direction of travel of the sub-signal 32 in the portion 74 is the +X direction, the direction of travel of the main signal 31 in the portion 73 is the −X direction, and the portion 74 and the portion 73 face each other in the Y direction.

Note that in the directional coupler 3, the portion 74 is "first portion" in the present disclosure, and the portion 73 is "second portion" in the present disclosure.

With this disposition in which the direction of travel of the sub-signal 32 in the portion 74 and the direction of travel of the main signal 31 in the portion 73 are opposite to each other, a signal that travels in a direction the same as the direction of the sub-signal 32 taken out from the main line 11 to the sub-line 12 can be taken out from the main line 11 to the inductor 14. That is, electromagnetic coupling that increases the sub-signal 32 can be formed by the first portion and the second portion. Accordingly, the effective degree of coupling of the directional coupler 3 can be increased, and a shortage of the degree of coupling is readily compensated for without an increase in the size of the directional coupler 3.

In the directional coupler 3, a portion 77 of the wiring line 24 and the portion 73 of the wiring line 23 are disposed so as to face each other such that the direction of travel of the sub-signal 32 in the portion 77 and the direction of travel of the reflected wave 33 of the main signal 31 in the portion 73 are opposite to each other.

In the example illustrated in FIG. 10, the direction of travel of the sub-signal 32 in the portion 77 is the −X direction, the direction of travel of the reflected wave 33 of the main signal 31 in the portion 73 is the +X direction, and the portion 77 and the portion 73 face each other in the Y direction.

Note that in the directional coupler 3, the portion 77 is "seventh portion" in the present disclosure.

As described above, in the portion 77 and the portion 73, the direction of travel of the sub-signal 32 in the portion 77 and the direction of travel of the reflected wave 33 of the main signal 31 in the portion 73 are opposite to each other, and therefore, in a case where the reflected wave 33 of the main signal 31 is produced in the main line 11, the reflected wave 33 is taken out from the main line 11 to the inductor 14.

That is, electromagnetic coupling is formed between the second portion of the second wiring line and the seventh portion of the first wiring line, and the reflected wave 33 that is not to be taken out from the main line 11 to the sub-line 12 is taken out. When electromagnetic coupling between the portion through which the sub-signal in a direction opposite to the direction of travel of the reflected wave of the main signal flows and the portion through which the reflected wave of the main signal flows is strong, the amount of the reflected wave 33 taken out increases, and the isolation characteristic of the directional coupler is degraded.

Accordingly, consideration is given to suppression of degradation of the isolation characteristic by employing a layout in which the seventh portion of the first wiring line (in the example illustrated in FIG. 10, the portion 77 of the wiring line 24) and the second portion of the second wiring line (in the example illustrated in FIG. 10, the portion 73 of the wiring line 23) are disposed further apart from each other.

Figure 11:
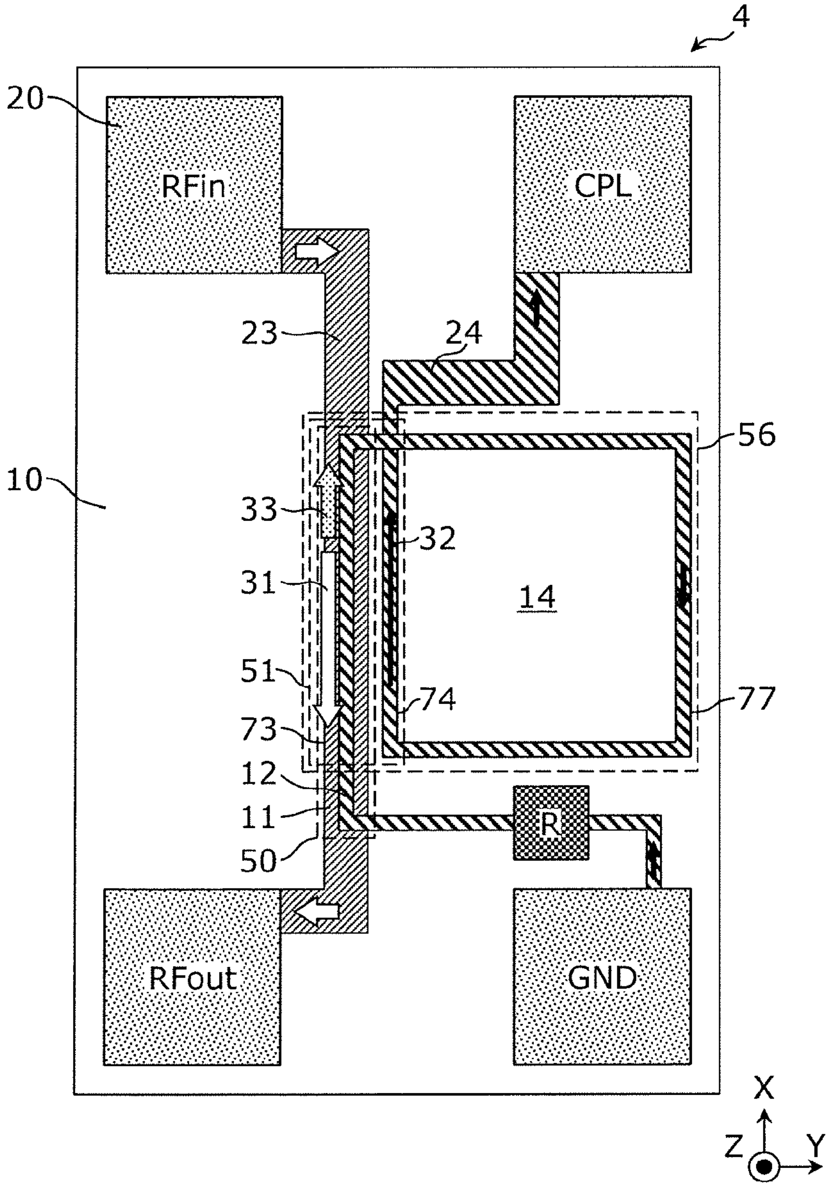
FIG. 11 is a plan view illustrating another example layout of the directional coupler according to the second embodiment.

FIG. 11 is a plan view illustrating an example layout of a directional coupler 4. As illustrated in FIG. 11, the directional coupler 4 differs from the directional coupler 3 illustrated in FIG. 10 in the layout of the wiring line 24. Specifically, in the directional coupler 4, the portion 77 of the wiring line 24 and the portion 73 of the wiring line 23 are disposed further apart from each other in a region 56 than the portion 77 and the portion 73 in the directional coupler 3.

With this disposition, electromagnetic coupling between the second portion and the seventh portion can be suppressed, and therefore, the directional coupler 4 having an increased isolation characteristic compared with the directional coupler 3 is obtained. Effects produced by the directional coupler 4 are described below by making a comparison with the directional coupler 3 on the basis of data obtained from simulation.

On the basis of the layouts illustrated in FIG. 10 and FIG. 11, models of the directional couplers 3 and 4 are set, and signal characteristics are obtained by simulation. In the simulation, models of the directional couplers 3 and 4 are set on the basis of a design in which the use frequency range of the directional couplers 3 and 4 is assumed to be 5 GHz to 6 GHZ.

Figure 12:
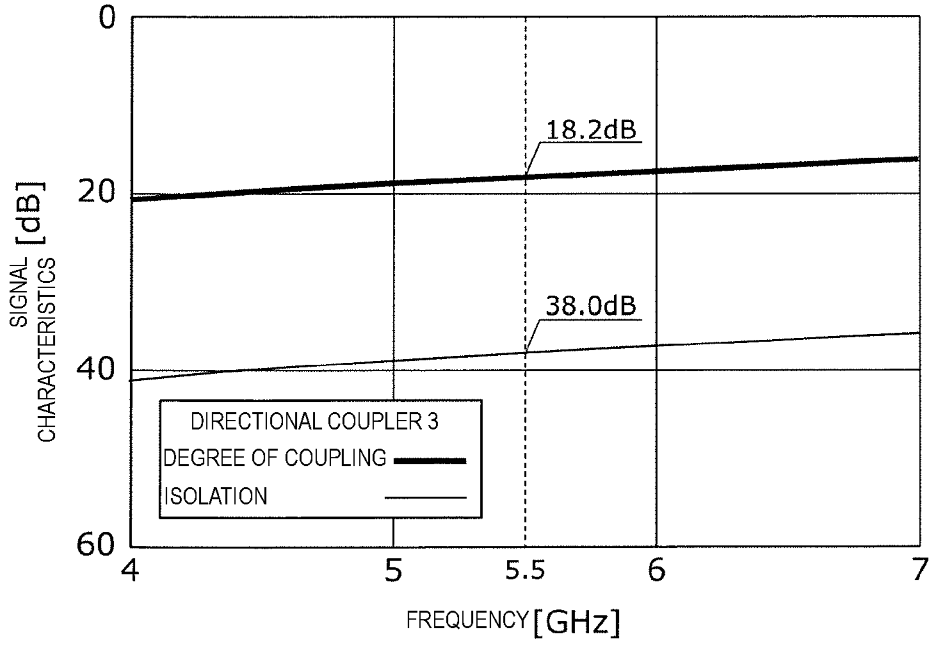
FIG. 12 is a graph showing example signal characteristics of the directional coupler according to the second embodiment.
Figure 13:
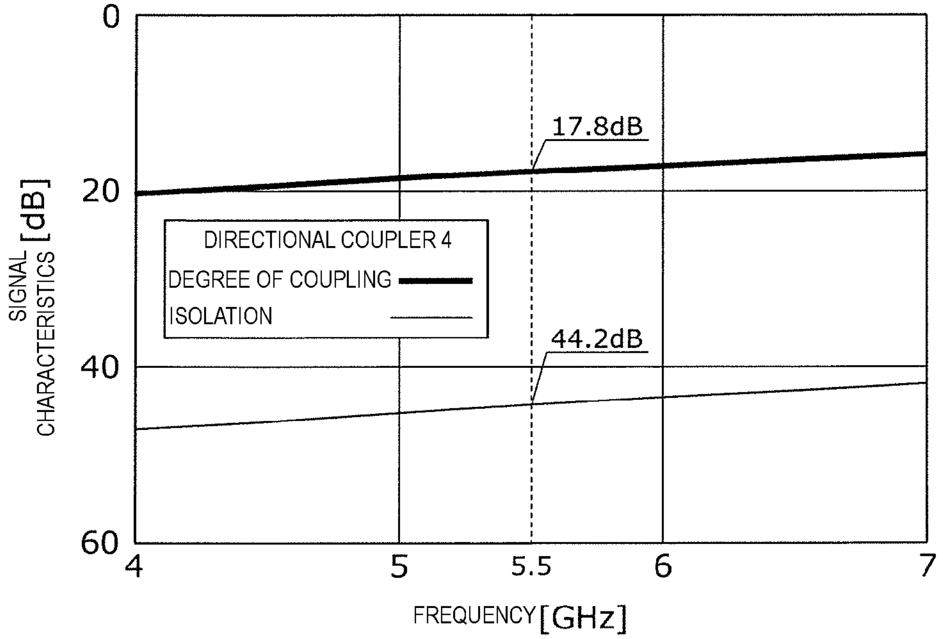
FIG. 13 is a graph showing other example signal characteristics of the directional coupler according to the second embodiment.

FIG. 12 and FIG. 13 are graphs showing example signal characteristics of the directional couplers 3 and 4 respectively and indicate the results of simulation of the degree of coupling and isolation. In the examples illustrated in FIG. 12 and FIG. 13, at 5.5 GHZ, the degree of coupling of the directional coupler 3 is 18.2 dB and the isolation thereof is 38.0 dB, and the degree of coupling of the directional coupler 4 is 17.8 dB and the isolation thereof is 44.2 dB.

As a result of a comparison between FIG. 12 and FIG. 13, it is found that in the directional coupler 4, a larger isolation is attained in the entire use frequency range of 5 GHz to 6 GHz than in the directional coupler 3.

Further, in the directional coupler 4, a relatively high degree of coupling is maintained in the entire use frequency range of 5 GHz to 6 GHz as in the directional coupler 3. This is because the portion 74 of the wiring line 24 and the portion 73 of the wiring line 23 in the directional coupler 4 are disposed close to each other (without any other element or wiring line interposed between the portion 74 and the portion 73) as with the portion 74 of the wiring line 24 and the portion 73 of the wiring line 23 in the directional coupler 3. In other words, this is because electromagnetic coupling that significantly increases the sub-signal 32 is formed by the portion 74 and the portion 73.

As described above, in the directional coupler 4, the isolation characteristic is made larger than in the directional coupler 3 without a decrease in the degree of coupling, and therefore, it is found that directionality expressed by the difference between the degree of coupling and the isolation characteristic is improved.

Accordingly, it is found that in the directional coupler according to the embodiment of the present disclosure, when the seventh portion of the first wiring line forming the inductor is disposed further apart from the second portion of the second wiring line than the first portion, the second wiring line forming a line, among the main line and the sub-line, to which the inductor is not connected, the directionality is improved. Specifically, in plan view of the directional coupler, as the distance between the first portion of the first wiring line and the second portion of the second wiring line becomes shorter and as the distance between the seventh portion of the first wiring line and the second portion of the second wiring line becomes longer, the directionality is improved.

Note that a case has been described where in the directional couplers 3 and 4, the seventh portion is included in the wiring line that forms the inductor connected to the sub-line. Also, in a case where the seventh portion is included in the wiring line that forms the inductor connected to the main line, when the seventh portion is disposed away from the sub-line, similar effects are attained.

Regarding the directional couplers 3 and 4, the third portion and the fourth portion are not mentioned. In a case where each of the directional couplers 3 and 4 includes the third portion and the fourth portion, when the length of the third portion and that of the fourth portion are made shorter than the length of the first portion and that of the second portion, effects similar to the effects described for the directional coupler 1 are attained. Further, regarding the directional couplers 3 and 4, the fifth portion and the sixth portion are not mentioned. When each of the directional couplers 3 and 4 further includes the fifth portion and the sixth portion in addition to the first portion and the second portion, effects similar to the effects described for the directional coupler 1 are attained.

Further, in the directional couplers 1 to 4, no components or wiring lines are disposed between the first portion and the second portion. Accordingly, the distance between the first portion and the second portion is readily made shorter, and the first portion and the second portion can be electromagnetically coupled with each other with more certainty. Note that components mentioned above include any components, such as passive components and active components, and wiring lines mentioned above include wiring lines for connecting components, pads for mounting components on the substrate, electrodes, and so on. Note that in a case where, for example, each of the directional couplers 1 to 4 is a ceramic multilayer body, only a ceramic material that forms the element assembly of the ceramic multilayer body is provided between the first portion and the second portion.

The directional coupler according to the present disclosure has been described above on the basis of embodiments; however, the present disclosure is not limited to the individual embodiments. Forms obtained by making various modifications conceived by a person skilled in the art to the embodiments and forms obtained by combining constituent elements in different embodiments without departing from the spirit of the present disclosure may be included in the scope of one or more forms of the present disclosure.

CONCLUSION

As described above, a directional coupler according to an aspect of the present disclosure includes: a main line through which a main signal flows; a sub-line through which a sub-signal corresponding to the main signal flows by electromagnetic coupling with the main line; and an inductor that is connected in series with one line among the main line and the sub-line and through which one signal among the main signal and the sub-signal flows. A first portion of a first wiring line forming the inductor and a second portion of a second wiring line forming the other line among the main line and the sub-line are electromagnetically coupled with each other.

As described above, when the first portion and the second portion are electromagnetically coupled with each other, the effective degree of coupling of the directional coupler can be increased, and a shortage of the degree of coupling is readily compensated for without an increase in the size of the directional coupler.

Further, as described above, a directional coupler according to an aspect of the present disclosure includes: a main line through which a main signal flows; a sub-line through which a sub-signal corresponding to the main signal flows by electromagnetic coupling with the main line; and an inductor that is connected in series with one line among the main line and the sub-line and through which one signal among the main signal and the sub-signal flows. A first portion of a first wiring line forming the inductor and a second portion of a second wiring line forming the other line among the main line and the sub-line are disposed so as to face each other such that a direction of travel of a first signal, in the first portion, flowing through the first wiring line, the first signal being the main signal or the sub-signal, and a direction of travel of a second signal, in the second portion, flowing through the second wiring line are opposite to each other.

With this configuration, electromagnetic coupling that increases the sub-signal can be formed between the first wiring line and the second wiring line by the first portion and the second portion. Accordingly, the effective degree of coupling of the directional coupler can be increased, and a shortage of the degree of coupling is readily compensated for without an increase in the size of the directional coupler.

Further, a third portion of the first wiring line and a fourth portion of the second wiring line may be disposed so as to face each other such that a direction of travel of the first signal in the third portion and a direction of travel of the second signal in the fourth portion are the same, and both a length of the third portion and a length of the fourth portion may be longer than a length of the first portion and a length of the second portion.

With this configuration, in a case where electromagnetic coupling that decreases the sub-signal is formed by the third portion and the fourth portion, the amount of decrease in the sub-signal by the third portion and the fourth portion is readily made below the amount of increase in the sub-signal by the first portion and the second portion. Accordingly, the effect of increasing the effective degree of coupling of the directional coupler is not compromised, and a shortage of the degree of coupling is readily compensated for without an increase in the size of the directional coupler.

Further, a fifth portion of the first wiring line different from the first portion and a sixth portion of the second wiring line different from the second portion may be disposed so as to face each other such that a direction of travel of the first signal in the fifth portion and a direction of travel of the second signal in the sixth portion are opposite to each other.

With this configuration, electromagnetic coupling that increases the sub-signal can be further formed between the first wiring line and the second wiring line by the fifth portion and the sixth portion. Accordingly, the effective degree of coupling of the directional coupler can be significantly increased, and a shortage of the degree of coupling is readily compensated for without an increase in the size of the directional coupler.

Further, a seventh portion of the first wiring line and the second portion of the second wiring line may be disposed so as to face each other such that a direction of travel of the first signal in the seventh portion and a direction of travel of a reflected wave of the second signal in the second portion are opposite to each other, and in plan view of the directional coupler, the seventh portion may be disposed farther from the second portion than the first portion of the first wiring line.

With this configuration, the first portion is readily disposed close to the second portion, and the seventh portion is readily disposed away from the second portion. Accordingly, degradation of the isolation characteristic of the directional coupler is readily suppressed and the degree of coupling is readily improved, and therefore, the directionality of the directional coupler is readily improved.

Further, a fifth portion of the first wiring line different from the first portion and a sixth portion of the second wiring line different from the second portion may be coupled (electromagnetically coupled) with each other.

Further, a seventh portion of the first wiring line and the second portion of the second wiring line may be coupled (electromagnetically coupled) with each other, and in plan view of the directional coupler, the seventh portion may be disposed farther from the second portion than the first portion of the first wiring line.

Further, in plan view of the directional coupler, no element or wiring line may be disposed between the first portion and the second portion.

With this configuration, the first portion and the second portion are readily disposed close to each other, and therefore, electromagnetic coupling that significantly increases the sub-signal is readily formed. Accordingly, the effective degree of coupling of the directional coupler can be more effectively increased, and a shortage of the degree of coupling is readily compensated for without an increase in the size of the directional coupler.

Further, the inductor may be connected to the main line.

With this configuration, the inductor connected to the main line can be used to attain the above-described effects. For example, in a case where a matching inductor is connected to the main line, the matching inductor can be used to compensate for a shortage of the degree of coupling of the directional coupler.

Further, the inductor may be connected to the sub-line.

With this configuration, the inductor connected to the sub-line can be used to attain the above-described effects. For example, in a case where a filter including an inductor is connected, the inductor included in the filter can be used to compensate for a shortage of the degree of coupling of the directional coupler.

The present disclosure can be widely used as a directional coupler.

1, 2, 3, 4, 9 directional coupler
10 substrate
11 main line
12 sub-line
13, 14 inductor
20 electrode
21, 22, 23, 24 wiring line
30 resistance element
31 main signal
32 sub-signal
33 reflected wave
41, 42, 43, 44, 45, 46, 49, 73, 74, 77 portion (of wiring line)
50, 51, 52, 53, 54, 55, 56, 59 region
61, 62, 63, 64 signal path

The invention claimed is:

1. A directional coupler comprising:
a main line through which a main signal flows;
a sub-line through which a sub-signal corresponding to the main signal flows by electromagnetic coupling with the main line; and
an inductor that is connected in series with one of the main line or the sub-line, and through which one of the main signal or the sub-signal flows, wherein:
a first portion of a first wiring line forms the inductor,
a second portion of a second wiring line forms the other of the main line or the sub-line that is not connected to the inductor in series,
a seventh portion of the first wiring line and the second portion of the second wiring line are coupled with each other,
the first portion of the first wiring line and the second portion of the second wiring line are electromagnetically coupled with each other, and
in plan view of the directional coupler, the seventh portion is disposed farther from the second portion than the first portion of the first wiring line.

2. The directional coupler according to claim 1, further comprising: a fifth portion of the first wiring line which is different from the first portion; and
a sixth portion of the second wiring line which is different from the second portion,
wherein the fifth portion of the first wiring line and the sixth portion of the second wiring line are coupled with each other.

3. The directional coupler according to claim 1, wherein
in plan view of the directional coupler, no element or wiring line is disposed between the first portion and the second portion.

4. The directional coupler according to claim 1, wherein the inductor is connected to the main line.

5. The directional coupler according to claim 1, wherein the inductor is connected to the sub-line.

6. The directional coupler according to claim 1, further comprising a resistor connected in series between the sub-line and ground.

7. The directional coupler according to claim 6, wherein the resistor is configured to terminate a reflected wave of the sub-signal on an end side of the sub-line.

8. The directional coupler according to claim 1, wherein the directional coupler is arranged in or on a multilayer substrate.

9. The directional coupler according to claim 8, wherein portions of the first wiring line and the second wiring line that overlap in plan view are disposed in different layers of the substrate with an insulation layer interposed therebetween.

10. The directional coupler according to claim 8, wherein portions of the first wiring line that cross each other are disposed in different layers of the substrate with an insulation layer interposed therebetween.

11. A directional coupler comprising:
a main line through which a main signal flows;
a sub-line through which a sub-signal corresponding to the main signal flows by electromagnetic coupling with the main line; and
an inductor that is connected in series with one of the main line or the sub-line and through which one of the main signal or the sub-signal flows, wherein:
a first portion of a first wiring line forms the inductor,
a second portion of a second wiring line forms the other of the main line or the sub-line that is not connected to the inductor in series,
the first portion of the first wiring line and the second portion of the second wiring line face each other such that a direction of travel of a first signal, in the first portion, flowing through the first wiring line, the first signal being the main signal or the sub-signal, and a direction of travel of a second signal, in the second portion, flowing through the second wiring line are opposite to each other, a third portion of the first wiring line and a fourth portion of the second wiring line face each other such that a direction of travel of the first signal in the third portion and a direction of travel of the second signal in the fourth portion are the same, and both a length of the third portion and a length of the fourth portion are longer than a length of the first portion and a length of the second portion.

12. The directional coupler according to claim 11, further comprising:

a fifth portion of the first wiring line which is different from the first portion; and a sixth portion of the second wiring line which is different from the second portion, wherein: the fifth portion of the first wiring line and the sixth portion of the second wiring line face each other such that a direction of travel of the first signal in the fifth portion and a direction of travel of the second signal in the sixth portion are opposite to each other.

13. The directional coupler according to claim 11, further comprising a seventh portion of the first wiring line, wherein:

the seventh portion of the first wiring line and the second portion of the second wiring line face each other such that a direction of travel of the first signal in the seventh portion and a direction of travel of a reflected wave of the second signal in the second portion are opposite to each other, and in plan view of the directional coupler, the seventh portion is disposed farther from the second portion than the first portion of the first wiring line.

14. The directional coupler according to claim 11, wherein the inductor is connected to the main line.

15. The directional coupler according to claim 11, wherein the inductor is connected to the sub-line.

16. A directional coupler comprising:

a main line through which a main signal flows;

a sub-line through which a sub-signal corresponding to the main signal flows by electromagnetic coupling with the main line; and an inductor that is connected in series with one of the main line or the sub-line and through which one of the main signal or the sub-signal flows, wherein:

a first portion of a first wiring line forms the inductor, a second portion of a second wiring line forms the other of the main line or the sub-line that is not connected to the inductor in series, the first portion of the first wiring line and the second portion of the second wiring line face each other such that a direction of travel of a first signal, in the first portion, flowing through the first wiring line, the first signal being the main signal or the sub-signal, and a direction of travel of a second signal, in the second portion, flowing through the second wiring line are opposite to each other, and a fifth portion of the first wiring line, which is different from the first portion, and a sixth portion of the second wiring line, which is different from the second portion, face each other such that a direction of travel of the first signal in the fifth portion and a direction of travel of the second signal in the sixth portion are opposite to each other.

17. The directional coupler according to claim 16, further comprising a seventh portion of the first wiring line, wherein:

the seventh portion of the first wiring line and the second portion of the second wiring line face each other such that a direction of travel of the first signal in the seventh portion and a direction of travel of a reflected wave of the second signal in the second portion are opposite to each other, and in plan view of the directional coupler, the seventh portion is disposed farther from the second portion than the first portion of the first wiring line.

18. The direction coupler according to claim 16, wherein the inductor is connected to the main line.

19. The directional coupler according to claim 16, wherein the inductor is connected to the sub-line.

* * * * *